United States Patent [19]
Peter et al.

[11] Patent Number: 4,840,349
[45] Date of Patent: Jun. 20, 1989

[54] DEVICE FOR ACTUATING A THROTTLE VALVE

[75] Inventors: Cornelius Peter, Ottersweiher; Uwe Schaper, Buehl-Vimbuch; Lothar Schmidt, Buehl-Altschweier, all of Fed. Rep. of Germany

[73] Assignee: Robert Bosch GmbH, Stuttgart, Fed. Rep. of Germany

[21] Appl. No.: 271,458

[22] Filed: Nov. 15, 1988

[30] Foreign Application Priority Data

Nov. 21, 1987 [DE] Fed. Rep. of Germany ... 8715467[U]

[51] Int. Cl.⁴ .............................................. F16K 31/04
[52] U.S. Cl. ............................... 251/129.11; 251/294; 251/248; 74/801
[58] Field of Search ................... 251/129.11, 294, 248; 74/801, 785

[56] References Cited

U.S. PATENT DOCUMENTS

| | | | |
|---|---|---|---|
| 1,240,318 | 9/1917 | Copeland | 74/785 |
| 4,611,617 | 9/1986 | Hewitt | 251/248 X |
| 4,705,061 | 11/1987 | Mueller et al. | 137/269 |

OTHER PUBLICATIONS

"An Electronic Engine-Control System for Motor Vehicles" MTZ Motortechnische Zeitschrift 46 No. (1985)4 pp. 129–133.

*Primary Examiner*—Arnold Rosenthal
*Attorney, Agent, or Firm*—Edwin E. Greigg

[57] ABSTRACT

A device that serves to actuate a throttle valve. The actuating device includes an electric drive motor and a step-down gear driven by the motor; an output shaft of the step-down gear is operatively connected to a throttle valve shaft which controls the throttle valve. The actuating device is compact in structure as well as versatile in use, even with various sizes of throttle valve, the step-down gear is embodied as a planetary gear having its output shaft provided with a gear wheel, which is operatively connected via a toothed belt with a second gear wheel, disposed on the throttle valve shaft. The motor is controlled by a control means assembled in the same housing as the motor and the throttle valve.

3 Claims, 1 Drawing Sheet

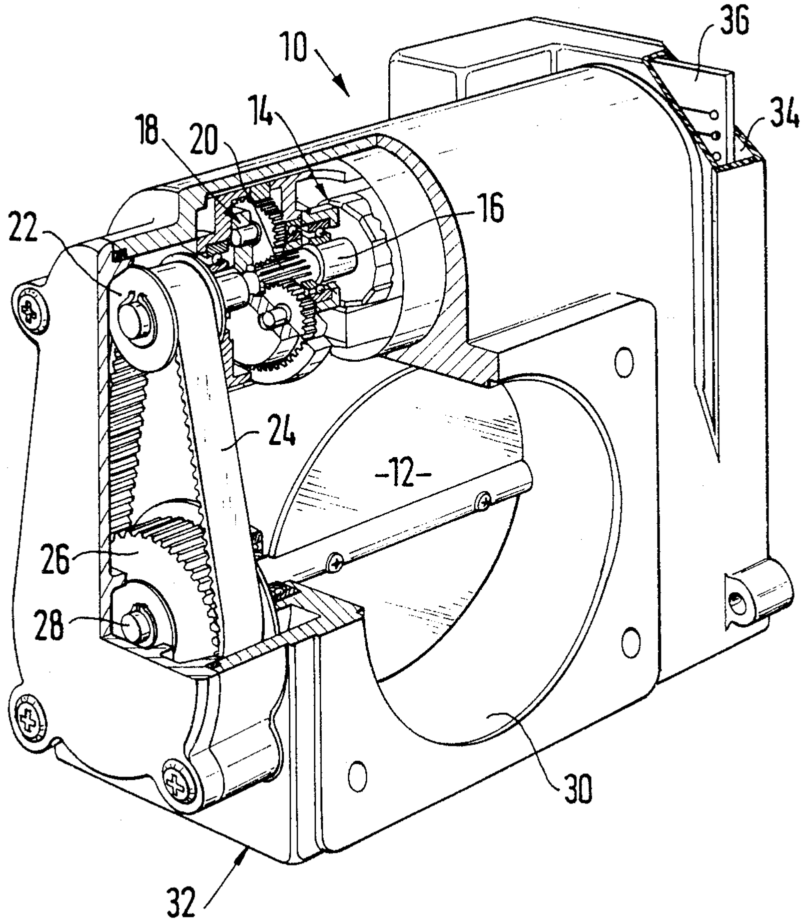
10
36
34
18
20
14
16
22
24
-12-
26
28
30
32

DEVICE FOR ACTUATING A THROTTLE VALVE

BACKGROUND OF THE INVENTION

The invention is based on an actuating device for actuating a throttle valve of an internal combustion engine. An actuating device is already on the market in which the drive motor is followed by a step-down spur gear that acts directly on the throttle valve shaft. This means that a completely new step-down gear must be designed for each size of throttle valve, because the distances between the step-down gear output shaft and the throttle valve shaft vary with the size of the throttle valve.

OBJECT AND SUMMARY OF THE INVENTION

The actuating device according to the invention has an advantage over the prior art in that various distances between the throttle valve and the output shaft can be taken into account simply and economically by means of a suitably adaptable toothed belt.

The invention will be better understood and further objects and advantages thereof will become more apparent from the ensuing detailed description of a preferred embodiment taken in conjunction with the drawing.

BRIEF DESCRIPTION OF THE DRAWING

The single drawing FIGURE shows an exemplary embodiment of an actuating device according to the invention, with the housing shown partially cut away.

DESCRIPTION OF THE PREFERRED EMBODIMENT

An actuating device 10 shown in the drawing for a throttle valve 12 has an electric drive motor 14, the armature shaft 16 of which acts upon a planetary gear 18. An output shaft 20 of the planetary gear 18 is provided with a pinion 22, which cooperates with a belt 24 having teeth on the inside. The toothed belt meshes with a gear wheel 26, which is mounted on a shaft 28. The shaft 28 supports not only the gear wheel 26 but also the throttle valve 12, which is located in the intake tube 30 of an internal combustion engine. As clearly seen in the drawing, the gear wheel or pinion 22 on the output shaft 20 of the planetary gear has a lesser number of teeth than the gear wheel 26 on the throttle valve shaft 28. It is also clear from the drawing that a variation in the size of the throttle valve 12, or a variation in the distances between the axes of the two shafts 20 and 28 can be compensated for by a corresponding adaptation of the toothed belt 24. Individual components, for instance such as those embodied by the drive motor 14, the planetary gear 18 with the pinion 22, and the throttle valve shaft 28 with the gear wheel 26 and the throttle valve 12, can thus be combined as needed and connected to a toothed belt 24 of suitably adapted length.

Finally, the drawing shows that a housing 32 receiving these components is provided with a separate chamber 34, in which an electronic control unit 36 for the drive motor 14 is accommodated. Disposing the chamber 34 near the electric motor 14 results in short transmission distances between the drive motor and the control unit, making them less likely to malfunction. The control unit receives its signals from various operative parameters of the engine including temperature pressure, etc.

The foregoing relates to preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A device for actuating a throttle valve, comprising an electric drive motor, a step down gear driven by said electric drive motor, said step-down gear that drives an output shaft, said output shaft is provided with a first gear wheel (22) which is operatively connected to a throttle valve shaft (28), said step-down gear is embodied as a planetary gear (18), said throttle valve shaft (28) is provided with a second gear wheel (26) that is disposed on one end of said throttle valve shaft (28), and said first and second gear wheels (22, 26) are operatively joined to one another by a toothed belt (24).

2. A device as defined by claim 1, which includes an electronic control unit (36) for controlling the drive motor, said control unit (36) is accommodated in a housing (32) of the device, which housing receives the drive motor (14), the planetary gear (18), and the throttle valve (12).

3. A device as defined by claim 1, in which said first gear wheel (22) on the planetary gear output shaft (20) has a lesser number of teeth than said second gear wheel (26) of said throttle valve shaft (28).

* * * * *